Jan. 11, 1966  A. McMILLAN  3,228,664
MIXING MACHINE

Filed May 14, 1962  6 Sheets-Sheet 1

INVENTOR.
ANDREW McMILLAN
BY W.D. O'Connor
ATTORNEY

Jan. 11, 1966  A. McMILLAN  3,228,664
MIXING MACHINE
Filed May 14, 1962  6 Sheets-Sheet 2

INVENTOR.
ANDREW McMILLAN
BY
M. D. O'Conney
ATTORNEY

Jan. 11, 1966  A. McMILLAN  3,228,664
MIXING MACHINE

Filed May 14, 1962  6 Sheets-Sheet 3

INVENTOR.
ANDREW McMILLAN
BY
W. D. O'Connor
ATTORNEY

Jan. 11, 1966  A. McMILLAN  3,228,664
MIXING MACHINE
Filed May 14, 1962  6 Sheets-Sheet 4
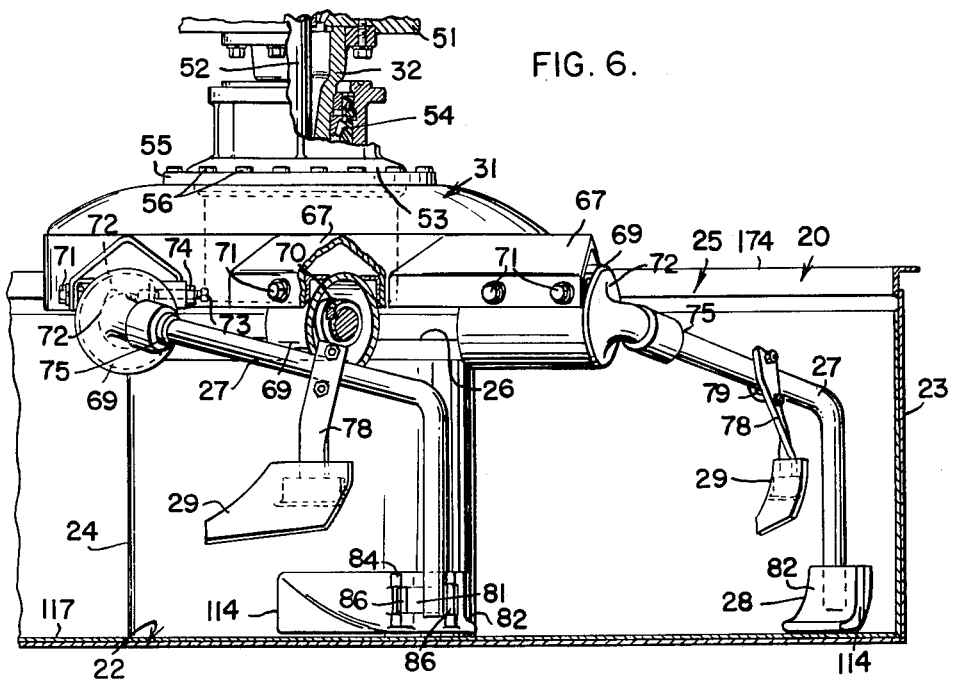
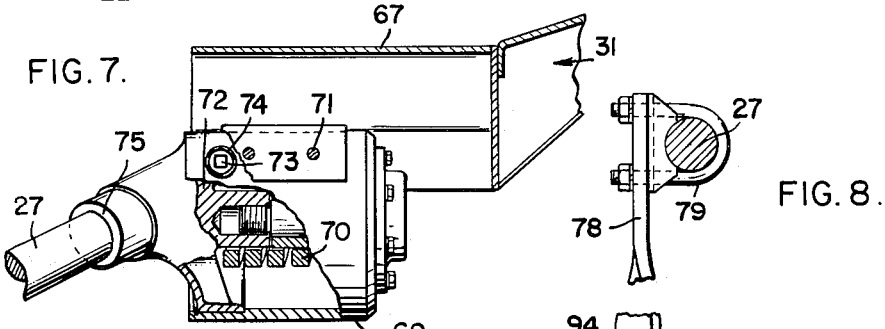
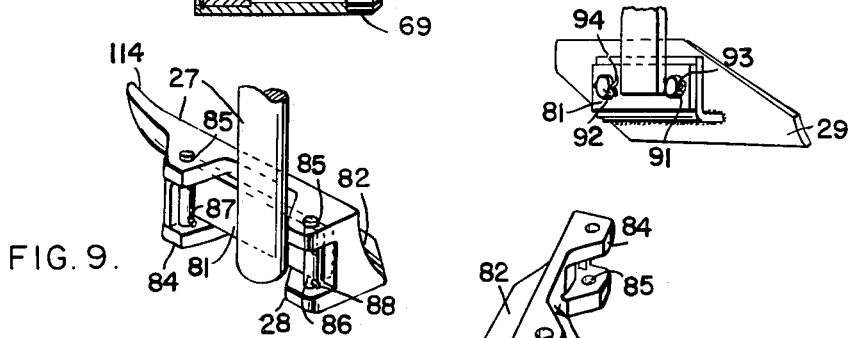
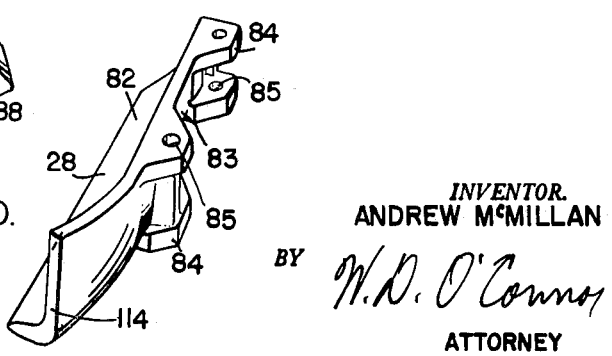
INVENTOR.
ANDREW McMILLAN
BY W. D. O'Connor
ATTORNEY

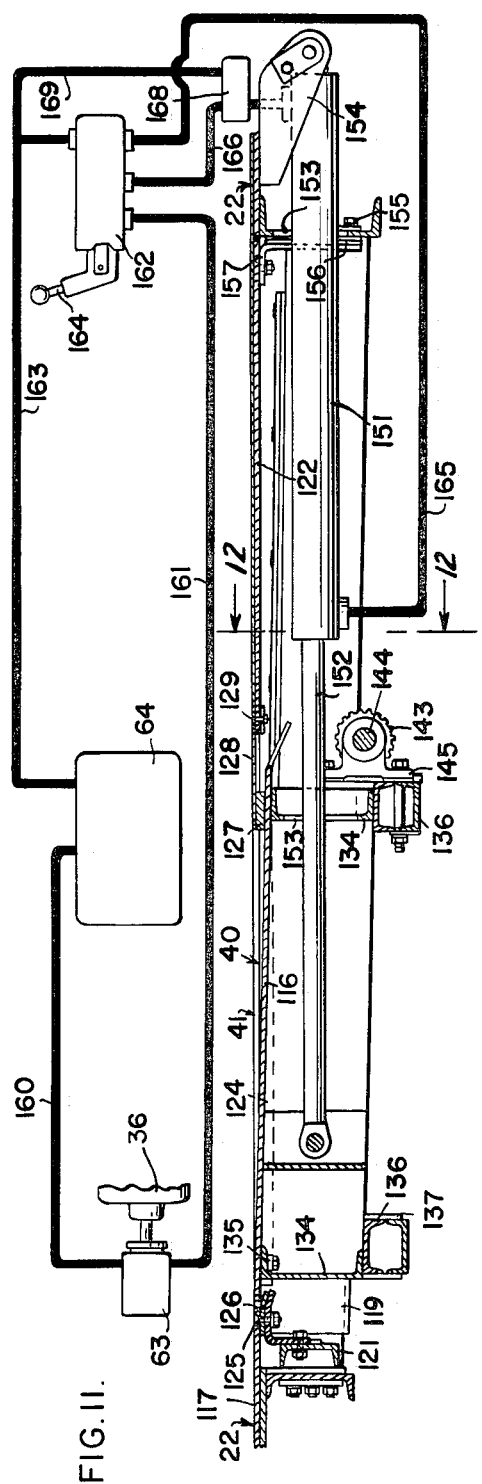
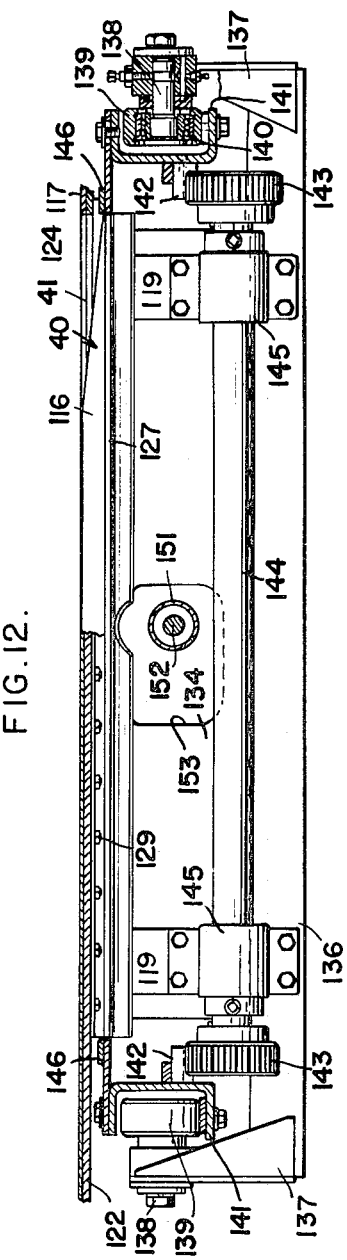

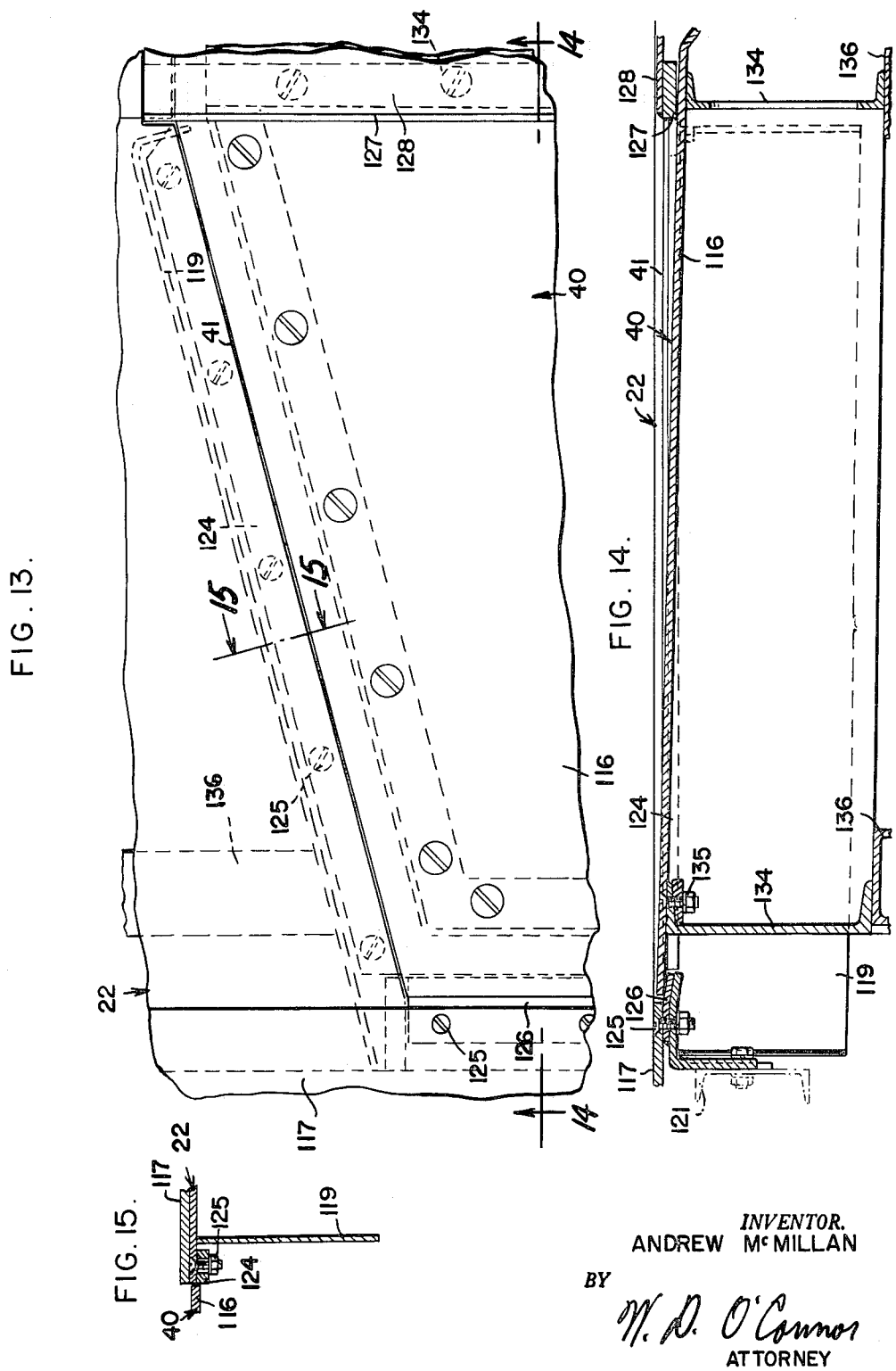

United States Patent Office 3,228,664
Patented Jan. 11, 1966

3,228,664
MIXING MACHINE
Andrew McMillan, Milwaukee, Wis., assignor to Rex Chainbelt Inc., a corporation of Wisconsin
Filed May 14, 1962, Ser. No. 194,377
4 Claims. (Cl. 259—178)

This invention relates generally to agitating apparatus and more particularly to mixing machines of the pan type adapted for mixing the ingredients of concrete and the like.

Mixing machines of this general description have been used for many years to mix a great variety of materials and have been made in many different forms. Some mixers of this type utilize gyrating mixing blades, some have rotating pans, and others employ both of these expedients or other equally complicated and cumbersome combinations of apparatus.

A simple and sturdy form of pan mixer uses a stationary circular pan that cooperates with a central rotating member carrying the mixing blades. The fixed mixing pan ordinarily has an upstanding cylindrical outer wall and may also have a cylindrical inner wall forming with the outer wall an annular trough constituting the mixing chamber through which the mixing blades circulate.

A controlled opening for discharging the mixed material is required in the mixing pan and this has in the past presented difficulties with regard to excessive leakage during mixing and to the proper regulation of the outflowing material during discharging. Furthermore, the conventional regulating doors used heretofore for closing the discharge openings have been generally unsatisfactory and difficult to operate. Also it has been troublesome to maintain them in good working order and they have taken up more space than was desirable.

The mixing pan is ordinarily provided with renewable lining plates and these plates together with the mixing blades are considered to be expendable. The replacement of these items when worn out has been difficult, however, because of the cramped working space in the pan and the incrustation of the parts by the materials being mixed, together with the fact that parts of the attaching means wear away and they are then troublesome to remove. Difficulties have also been experienced in furnishing liquid ingredients to the batch being mixed particularly in distributing and mixing-in the liquid quickly and evenly throughout the batch.

All of these difficulties become magnified and the mixing operation becomes more critical as the capacity of the mixer is increased. An important reason for this is that the diameter of the mixing pan cannot be increased much because of shipping and installation space limitations and therefore increased capacity necessarily is obtained by increasing the depth of the mixing pan to receive a deeper batch of material being mixed. This results in complicating the mixing operation, increasing the heating of the batch and in reducing the accessibility of the expendable items within the pan for servicing.

It is therefore a general object of the present invention to provide an improved mixer of the pan type that is of increased capacity and of generally rugged and trouble-free construction.

Another object of the invention is to provide an improved mixer that is capable of rapid and thorough mixing of the ingredients of concrete and like granular and adhesive materials.

A further object is to provide an improved pan mixer having self-contained means for lowering the pan readily to afford convenient access to the renewable elements of the mixer.

According to this invention, an improved mixing machine of the pan type having an annular mixing chamber is provided with novel features that facilitate the mixing of low slump concrete and the like and that insure continued operation with a minimum of trouble and expense. The pan of the improved mixer is suspended from a horizontal frame that carries a driving motor connected to a novel driving mechanism which drives the mixing blades. The driving mechanism includes a speed reducing gear system in a housing that is fixed in the frame and that has rotatably mounted on its lower end a mixing rotor that carries mixing blades in cooperating relationship with the mixing pan. The mixing blades are mounted on resilient arms by means of pins that may be driven out readily to remove the blades even though covered with accumulated concrete. Each arm carries a lower blade operating near the bottom of the pan and an upper blade disposed above and ahead of the corresponding lower blade. During mixing the upper blades urge the material outwardly while the lower blades urge it inwardly thereby establishing a circular motion causing the material to flow in a general helical toroidal path about the annular mixing chamber. Mixing water is introduced through a nozzle that directs it onto the mixing rotor for distribution into the batch. An auxiliary nozzle directs additional water onto the material that lies under and is shielded by the rotor. For discharging the mixed concrete, an improved discharge opening in the shape of an isosceles trapezoid is provided in the floor of the pan with its narrow end downstream of the mixing direction. A door of complementary shape is mounted for endwise sliding movement beneath the floor at a slight inclination such that its narrow end closes flush with the narrow end of the opening and its sides wedge against the tapering sides. Grout collecting on the inclined door seals it to prevent leakage. The door is operated by hydraulic power means which serves to withdraw it endwise beneath the upstream end of the opening, the amount of movement being controlled to regulate the degree of opening and the rate of discharge. Because of the wedging closure, the door operates without jamming or binding and with very little wear along its sealing edges. To facilitate renewal of blades and other wearing parts, the mixing pan is suspended from the frame by long bolts that are arranged to operate as jack screws for lowering the pan below the level of the blades.

The foregoing and other objects of this invention will become more fully apparent upon perusing the following detailed explanation thereof in conjunction with the accompanying drawings illustrative of improved mixing apparatus constituting the presently preferred embodiment of the invention wherein:

FIG. 6 is an enlarged fragmentary view partly in elevation and partly in vertical section of the right hand portion of the mixing machine as shown in FIG. 4 illustrating the arrangement of the mixing blades and showing part of the drive mechanism;

FIG. 7 is an enlarged detailed view partly in section, of one of the mixing arm supporting brackets showing the resilient mountings;

FIG. 8 is a detailed view partly broken away showing one of the upper mixing blades;

FIG. 9 is a detailed view in perspective of one of the lower mixing blades showing the improved attaching arrangement;

FIG. 10 is another view in perspective of the blade shown in FIG. 9 taken from a different angle;

FIG. 11 is a fragmentary view in longitudinal section through the discharge door taken on the plane represented by the line 11—11 in FIG. 3 and showing in addition the hydraulic actuating mechanism for the door;

FIG. 12 is a view in transverse section through the door mechanism taken on the plane represented by the line 12—12 in FIG. 11;

FIG. 13 is an enlarged fragmentary plan view of one side of the discharge opening and part of the cooperating door;

FIG. 14 is an enlarged view in longitudinal section through the door taken on the plane represented by the line 14—14 in FIG. 13; and FIG. 15 is an enlarged detailed view in transverse section taken through the edge of the door and the mating frame on the plane represented by the line 15—15 in FIG. 13.

Figures 1, 2:
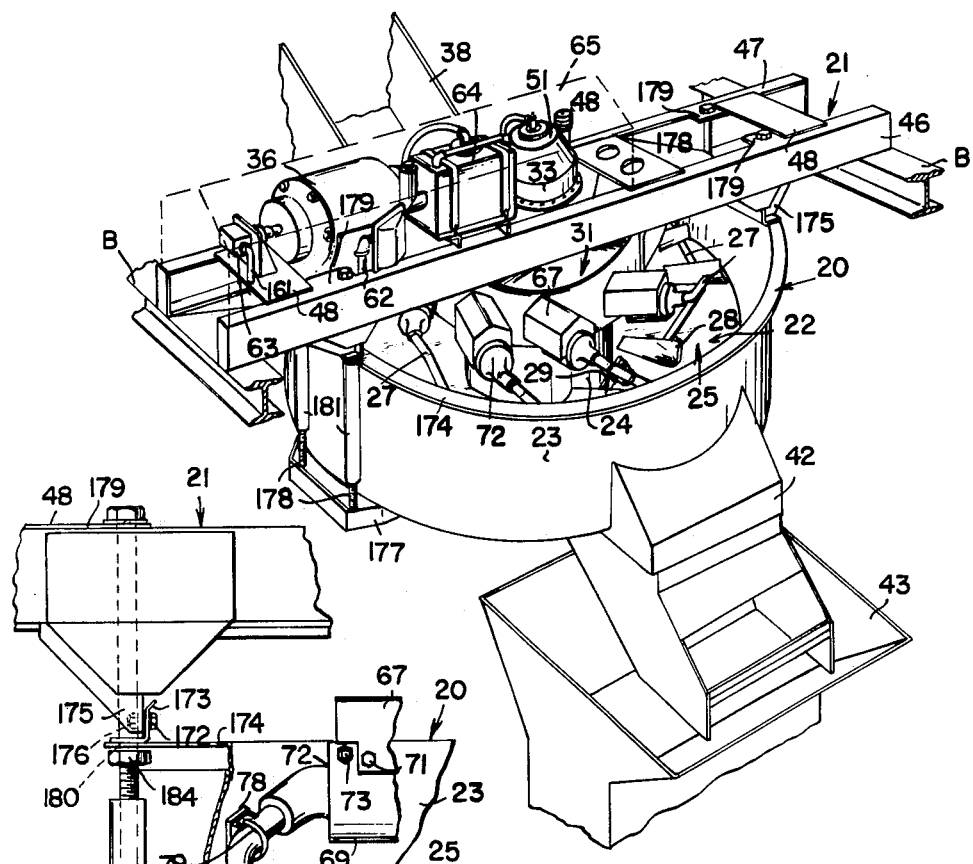
FIGURE 1 is a view in perspective of a mixing machine of the fixed annular pan type embodying the novel features of the invention.
FIG. 2 is an enlarged fragmentary view in elevation of parts of the left end of the machine shown in FIGURE 1 and illustrating the manner in which the mixing pan may be lowered top rovide access to the interior.

The particular mixing machine shown in the drawing as embodying features illustrative of the present invention is of the fixed annular pan type and is herein described as being especially adapted for mixing the ingredients of concrete, although it is to be understood that it may be used to advantage in the mixing of various other materials as well. The illustrated mixing machine herein set forth constitutes the best mode contemplated of carrying out the invention.

Figure 3:
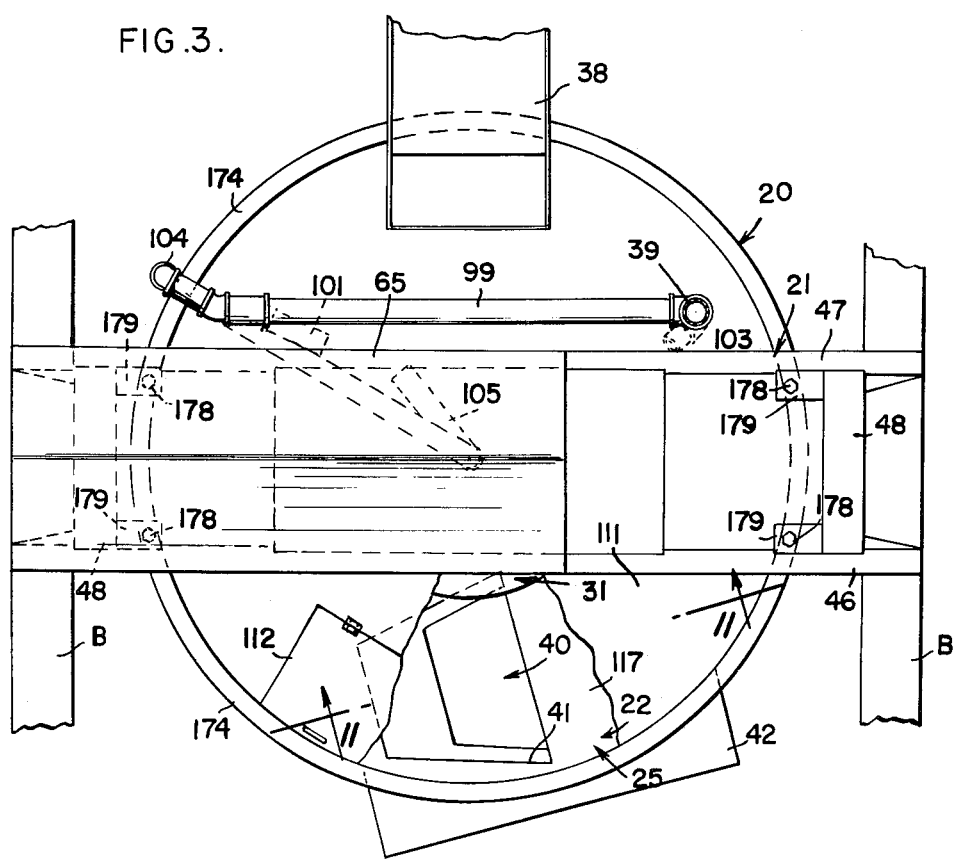
FIG. 3 is a plan view of the mixing machine illustrated in FIGURE 1 with parts broken away to show the discharge opening and cooperating door.
Figure 4:
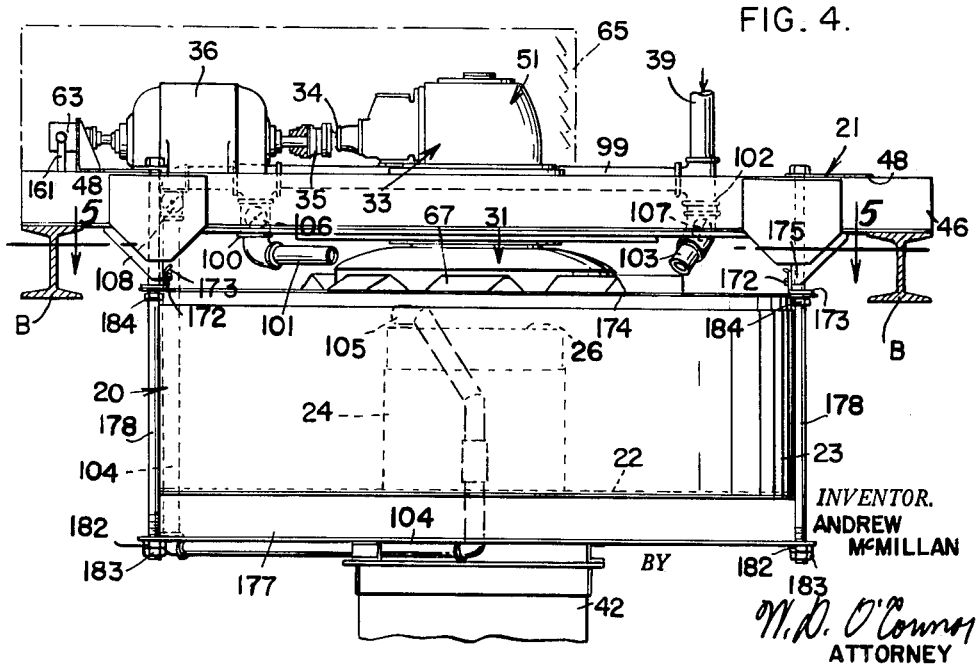
FIG. 4 is a view in side elevation of the mixing machinn in FIG. 3.

Referring now more specifically to the drawing and particularly to FIGS. 1, 3 and 4 thereof, the pan mixing machine there shown generally by way of illustration comprises essentially a stationary circular mixing pan 20 that is suspended from a main frame 21 extending horizontally above it. As shown in the drawing, the main frame 21 is supported at its respective ends upon suitable abutments such as transverse beams B that may in this instance represent elements of the framework of a structure such as a mixing plant housing the mixer and its associated equipment.

The mixing pan or drum 20 has a flat horizontally disposed circular floor 22 joined at its periphery to an upstanding cylindrical outer wall 23. An inner cylindrical wall 24 of generally similar height is spaced inwardly from the outer wall 23 in a manner to define between them an annular trough a mixing chamber 25 of generally rectangular section for receiving ingredients to be mixed. The inner wall 24 encircles a central cylindrical opening 26 of substantial diameter extending vertically through the pan. In the particular mixer illustrated, the annular mixing chamber 25 is of relatively large capacity and deeper than usual, being capable of mixing in excess of four cubic yards of concrete at a time. The machine, however, may be made in various other sizes either larger or smaller as desired.

Mixing arms 27 carrying lower mixing blades 28 and upper mixing blades 29 extend into the mixing chamber 25 outwardly and downwardly from a central mixing rotor 31. The rotor 31 is arranged concentric with the vertical axis of the pan 20 and is mounted for rotation upon the lower end of a vertically disposed stationary cylindrical cannon element 32 that projects downward from a speed reducing power transmission mechanism 33 carried by the horizontal main frame 21. A driven input shaft 34 extending horizontally from the transmission mechanism 33 is connected by a coupling 35 to a driving motor or power source which in this instance is an electric motor 36 also mounted on the main frame 21 and disposed longitudinally thereof.

The dry ingredients of the concrete being mixed are fed into the mixing chamber 25 through a charging chute 38 in proper proportions in accordance with well known practice. Water constituting the liquid ingredient is introduced through water supply piping 39 in the required amount to complete the batch. The rotor 31 and attached blades 28 and 29 are rotated by the motor 36 to distribute the ingredients as they are fed into the chamber 25 and continue rotating to mix them. When the ingredients are sufficiently mixed, a door 40 closing a discharge opening 41 in the floor 22 of the pan 20 is opened to discharge the mixed material through a discharge chute 42. The chute 42 if desired may discharge into a holding hopper 43 in order to store one mixed batch so that a delivery vehicle, such as a truck mixer or the like may be loaded expeditiously with say eight cubic yards of concrete, four yards from the holding hopper 43 followed by four more yards discharged directly from the mixing chamber 25 through the chute 42 and the hopper 43.

Considering the structure of the improved mixer now more in detail, the main supporting frame 21 comprises a pair of spaced transverse beams 46 and 47 that are in this instance box section beams formed by channel members closed by flat plates. The spaced beams 46 and 47 rest at their ends upon the supporting structural beams B that are shown as being in the form of I-beams. As best shown in FIGS. 3 and 4, the transverse box beams 46 and 47 are joined in spaced relationship by a plurality of cross members 48 to form a bridge that constitutes the support for the driving mechanism as well as for the suspended pan 20.

The speed reducing power transmission mechanism 33 is contained within a generally round casing or housing 51 that fits between and is firmly secured to the spaced beams 46 and 47 and to the cross members 48 in manner to constitute in effect an integral central part of the main frame bridge structure. As best shown in FIG. 6, the previously mentioned vertically disposed depending cannon element 32 is secured at its upper end to the lower side of the transmission housing 51 concentric with the circular pan 20 and centrally of the frame 21, the arrangement being such that the cannon is supported rigidly by the main frame in manner to resist the forces imposed upon it as the result of rotating the rotor 31 in moving the directly-connected mixing blades 28 and 29 through the ingredients in the mixing chamber 25.

Within the central housing 51, the power transmission mechanism 33 comprises direction changing and speed reducing gearing (not shown) preferably of the well-known hypoid gear type, that is driven by the horizontal input shaft 34 and that is operatively connected to drive a vertically disposed output shaft 52 at reduced speed. As best shown in FIG. 6, the vertical output shaft 52 extends down through and is journalled within the depending cylindrical cannon element 32 that carries the mixing rotor 31. The lower end of the vertical shaft 52 extends into a cylindrical hub or housing 53 that is journalled on the lower lower end of the cannon 32 by means of anti-friction bearings 54. The hub 53 extends downward within the center of the mixing rotor 31 and is provided with a central flange 55 that is secured to the top of the rotor 31 by cap screws 56. Housed within the cylindrical hub 53 at the lower end of the cannon 32 is a speed reducing power transmission mechanism (not shown) preferably of the well known planetary type, that is connected to the lower end of the vertical shaft 52 in manner to be driven thereby and that is operatively connected to drive the hub 53 at reduced speed by turning it on the bearings 54.

The two speed reducing mechanisms interposed between the driving motor 36 and the mixing rotor 31 are so designed that the rotor is turned at an appropriate mixing speed whereby the outermost mixing blades move through the material being mixed at an optimum maximum peripheral speed of about six hundred and twenty-five feet per minute. This requires that the mixing rotor 31 be turned at the slow speed of about nineteen revolutions per minute and to accomplish this the speed reducing mechanisms operate to reduce the speed from about seventeen hundred and sixty revolutions per minute at the input shaft 34 which is driven directly by the motor 36. The motor 36 is mounted upon cross members 48 of the frame 21 and is furnished with electrical energy through an electrical conduit 62 from the usual transmission line and motor control apparatus (not shown). By reason of being mounted on top of the frame 21, the motor 36 is readily accessible and is exposed for better cooling. At its end opposite from the coupling 35 that connects with the horizontal shaft 34, the motor 36 is operatively connected to a pump 63 which it drives to pump hydraulic fluid from a reservoir 64 also mounted on the frame 21 for operating the discharge door 40 hydraulically. A hood or housing 65 is fitted over the motor 36 and the transmission mechanism 33 and is slidably mounted on the frame 21. To gain access to the motor 36, the housing 65 may be slid endwise on the frame 21 to the right as shown in FIG. 4 or it may be removed entirely if more room is required.

The central mixing rotor 31 is rotatably mounted on the lower end of the depending vertically disposed cannon 32 is of circular dome shape somewhat larger in diameter than the cylindrical inner wall 24. The rotor 31 is positioned just above and overhangs the inner wall 24 forming a hood over the central opening 26 that is defined by the wall 24 in the center of the pan 20. As may best be seen in FIG. 5, the mixing rotor 31 is provided on its periphery with a series of integrally formed outwardly projecting mixer blade carrying brackets 67, in this particular instance eight brackets variously spaced angularly about the rotor. As shown, the several brackets 67 are inclined rearwardly with reference to the direction of rotation or mixing direction that is indicated by the arrow 68 as being clockwise in this instance, the angle of inclination of the brackets being about thirty-five degrees relative to a radius of the rotor.

Each of the blade carrying brackets 67 is roof-like in shape and so constructed that it serves to sustain the impact of and to divert any large aggregates intermingled in the ingredients that may strike upon the brackets when being charged into the mixing chamber 25 through the charging chute 38. Furthermore, the extending brackets 67 are of sufficient strength and sturdiness to withstand the forces arising when turning the mixing blades through the ingredients being mixed and particularly the high forces that may arise in restarting the mixing operation should the mixer stop with the blades buried in the mass of ingredients.

As best shown in FIGS. 6 and 7, each blade carrying bracket 67 overlies and supports a cylindrical housing 69 containing a heavy, rugged helical spring 70 that forms the resilient mounting for the associated blade arm 27. The cylindrical housing 69 fits beneath the roof-like bracket 67 and is secured to it by bolts 71. The coiled torsion spring 70 abuts at its inner end against a projection on the closed inner end or head of the cylindrical housing 69. The outer end of the spring 70 abuts against a lug on the inner side of a hub 72 that is journalled in the outer end of the cylindrical housing 69. After the spring 70 has been tightened, the hub 72 is held in position by an adjusting screw 73 secured by a lock nut 74 and that engages a lug on the inner side of the hub 72 for turning it to adjust the position of the mixing blades.

The outer side of each hub 72 is provided with a socket 75 that is angularly positioned to receive one end of one of the mixing arms 27 that carry the mixing blades. As shown, each mixing arm 27 is constituted by a round bar preferably of steel that is bent to support the blades in the desired position relative to the pan 20. A straight end portion of each arm 27 is received within the socket 75 of the spring pressed hub 72 in the corresponding spring housing 69. From the straight end portion received in the socket 75 each arm is bent rearwardly and then bent downwardly, the arrangement being such that when the torsion spring 70 is properly adjusted by the adjusting screw 73 it normally holds the lower end of the arm 27 and the lower blade 28 thereon in closely spaced working relationship with the floor 22 of the pan 20. Should the blade 28, however, encounter an obstruction, such as a stone that might wedge under it, the torsion spring 70 will permit the blade and its arm to lift sufficiently to pass over the obstruction and then will return the blade to its normal adjusted working position. By reason of the rearward inclination of the blade carrying brackets 67, upward movement of each outermost lower blade 28 occurs along an arc leading inwardly away from the outer wall 23 thereby avoiding contact with the wall.

Figure 5:
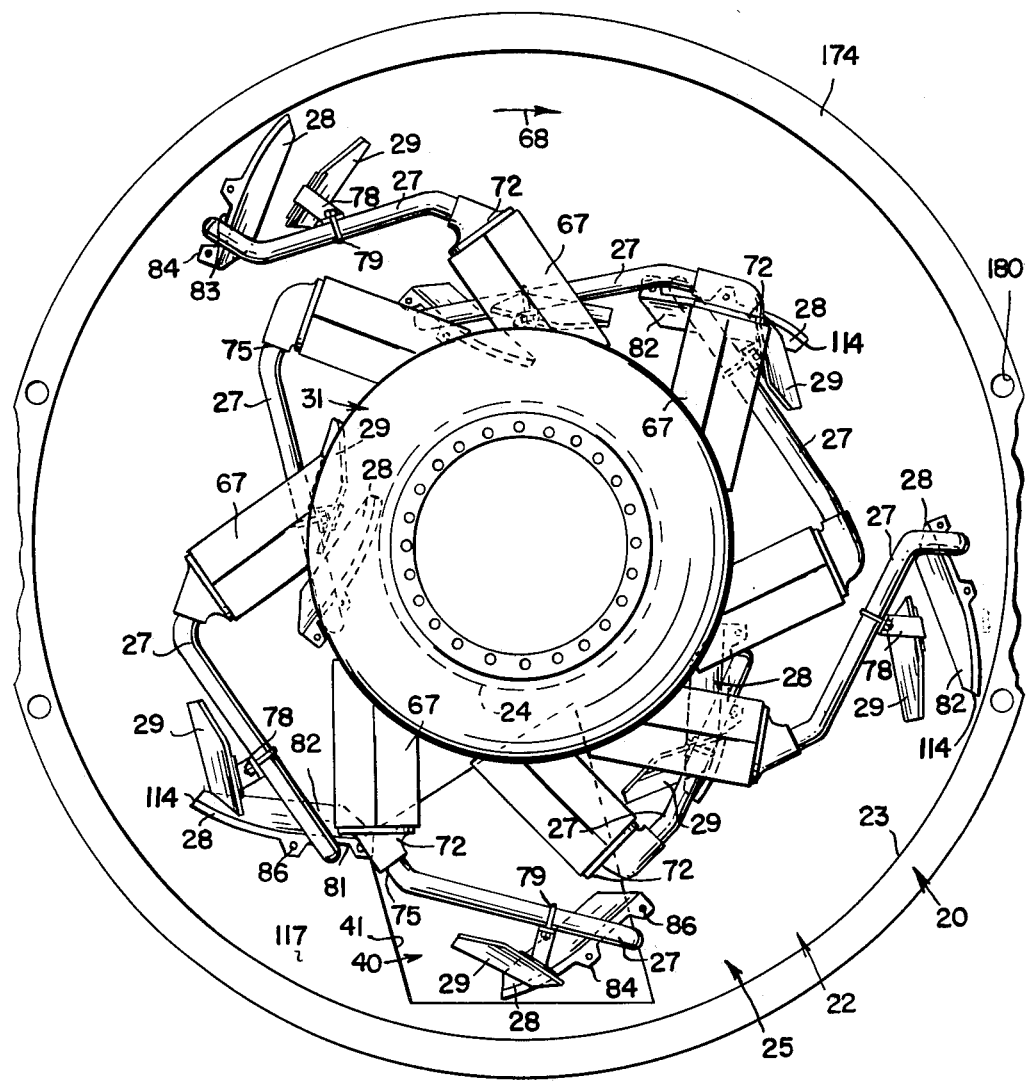
FIG. 5 is a view in horizontal section through the machine, taken on the plane represented by the line 5—5 in FIG. 4 and showing the arrangement of the mixing blades within the pan.

As indicated in FIG. 6 of the drawing, the lower mixing blades 28 on the lower ends of the several mixing arms 27 all are adjusted as explained to operate as close to the floor 22 as practicable without actually contacting the pan. As shown in FIG. 5, the several arms 27 are bent differently in order that the blades 28 may follow different paths in circulating about the mixing pan 20. The various blade arms 27 are in that way arranged to position the blades for best mixing action in moving through the ingredients being mixed. At the same time they are so mounted that the forces exerted upon the blades during mixing are balanced against each other in manner to avoid excessive lateral forces upon the mixing rotor 31 and its supporting structure.

The heavy, simple blades 28 and 29 are generally plow-like in form and operate to plow the ingredients being mixed in the one or the other direction laterally as well as to advance them in the mixing direction. As shown, the lower blades 28 are positioned and adapted to plow the material inwardly from the outer wall 23 towards the inner wall 24 with the exception of the innermost blades which are set to plow the material outwardly and upwardly from the inner wall. The upper mixing blades 29 are carried by the arms 27 above and forwardly or ahead of the respective lower blades 28, the upper blades being somewhat smaller and lighter than the lower blades. The several upper blades are positioned and adapted to plow the material outwardly from the inner wall 24 towards the outer wall 23 with the exception of the outermost upper blades which are set to plow the material inwardly away from the outer wall.

By this double-decker arrangement of the upper and the lower plow-shaped blades, their cooperative action when mixing results in a generally circulatory motion of the material inwardly near the floor 22 of the pan 20 then upwardly and outwardly through the upper portion of the material.

This circular motion that is imparted to the material being mixed is coupled with its forward motion in the mixing direction to constitute a mixing motion that follows a generally helical path around the annular mixing chamber 25 that is toroidal in overall configuration. This helical toroidal circumvolutionary movement of the ingredients being mixed results in rapid and thorough mixing thereof in the most expeditious manner with each mixing blade serving both to mix the materials it encounters directly and to impart to the mass of material the overall toroidal circulating movement that provides an intermingling action which establishes uniformity throughout the batch being mixed.

Both the lower and the upper blades, because of their plow-like configurations, also exert a lifting action upon the ingredients which serves to effect a further commingling of the materials being mixed. During the mixing operation, each upper mixing blade 29, being above and forwardly of the corresponding lower mixing blade 28, serves to lift the material being mixed in a manner to relieve the lower blade of part of the weight of material that would otherwise bear down upon it thereby permitting the lower blade more freedom to lift and mix the ingredients encountered by it. Under some circumstances and with some materials this relieving action of the upper blades may not be essential to good mixing results in which case some of the upper blades may be removed from the blade carrying arms 27 or perhaps all of the upper blades may be removed and the mixer operated for some purposes with only the lower blades 28.

With the mixing blades being forced rapidly through the mass of material in the mixing chamber 25, the motor 36 that drives them is called upon to exert a large amount of power. This power is converted into heat within the material being mixed and may cause its temperature to rise. If it is necessary to avoid any increase in the temperature of the particular material being mixed, the mixing pan 20 may be provided with a suitable water jacket or other means for cooling the pan and the material within it.

Although the lower mixing blades 28 are connected directly to the lower ends of the mixing arms 27, the upper mixing blades 29 are carried by auxiliary arms 78 that are clamped to the rearwardly extending generally horizontal portions of the arms 27. As appears in FIGS. 6 and 8, the auxiliary arms 78 are in the form of twisted flat bars and each is provided with a U-bolt clamp 79 at the upper end which fits over the round bar constituting the mixing arm 27. In this manner the arm 78 is made adjustable on the bar 27 both longitudinally and angularly in order that the upper mixing blade 29 on its lower end may be set in optimum position as required relative to the corresponding lower mixing blade 28 after which the arm 78 is clamped rigidly in adjusted position by tightening the clamp 79. When the proper adjustment has been effected with respect to each of the upper blades 29, for the particular material being mixed, their associated clamps may be welded to the arms 27 to prevent displacement under the strains of the mixing action.

Both the main mixing arms 27 and the auxiliary arms 78 are provided at their lower ends with blade supporting cross pieces or wings 81 that are secured to the arms rigidly by welding or the like. As best seen in FIG. 9, the lower mixing blade 28 for example, being plow-like in shape, presents a curved mixing face 82 on its forward side. On its opposite or rearward side the blade 28 presents an attachment pocket or socket 83 shaped to receive the cross piece 81 on the lower end of the arm 27. When the mixing rotor 31 is rotating in the mixing of ingredients, the cross piece or wing 81 is forced by the arm 27 against the rearward side of the blade 28 within the socket 83 in order to force the mixing face 82 of the blade forwardly against the ingredients encountered by the blade to displace and mix them. Accordingly, the major mixing forces generally are transmitted directly from the arm 27 through the cross piece 81 and the body of the blade 28 to the material engaged by the mixing face 82. Under these conditions the blade 28 would be held on the arm 27 even without the aid of any fastening means so long as normal mixing continued, the mixing forces being transmitted from the arm to the blade quite independently of any blade holding means.

In order that the blade may remain in place when discharging for instance, a novel and improved arrangement is provided, for retaining the blade 28 on the arm 27 in a manner that permits ready removal when worn. To this end the blade 28 has on its rearward side two pairs of spaced lugs 84 that project rearward in straddling relationship with the respective ends of the cross piece 81. The lugs 84 of each pair are provided with vertically aligned round holes 85 adapted to receive a straight sided retaining pin 86, the two pins 86 when positioned in the pairs of vertical holes 85 serving to prevent removal of the blade from the cross piece 81. As shown in FIG. 9, the pins 86 extend vertically just behind the respective end portions of the cross piece 81 and each pin is provided with two transverse key holes 87 positioned just inwardly of the respective lugs 84 of each pair. Cotter pin keys 88 or the like secured in the key holes 87 serve as temporary restraining means to prevent the pins 86 from moving out of blade retaining position during operation of the mixer.

When the mixer is operated in mixing material of an adherent nature such as the ingredients of concrete, some of the ingredients adhere to the mixing blade and the supporting arm and build up within the socket 83 about the cross piece 81, the lugs 84 and the vertical pins 86 thereby locking the pins securely in blade retaining position and seating the cross piece 81 firmly within the socket 83 where it is protected from wear. After this accumulation of adherent material about the blade fastening means has set, the blade 28 is as securely attached to the arm 27 as though it had been fastened intially by tightening screw threaded bolts and nuts or the like.

Since the blades 28 are subject to relatively rapid wearing away in operating through action of the abrasive material being mixed, they are considered to be expendable and are replaced at intervals of perhaps a few months. When screw threaded fasteners are used, removal of worn blades presents a difficult problem since the fasteners are not only incrusted with hardened material but the wrench receiving surfaces thereof may be worn away to such as extent as to be rendered useless.

With the improved blade securing arrangement provided by this invention, removal of worn blades becomes a simple matter since it is merely necessary to drive out the retaining pins 86. This is accomplished by driving them downward by means of a suitable punch or the like thereby shearing the cotter pins 88 and driving the pins 86 through the concrete or other material that has set around them. This can be done best with the blades positioned over the open discharge opening 41 to provide room for the pins 86 to move downward out of the vertical holes 85. Furthermore, since the blades have worn thin they may be broken by hammer blows to facilitate removal from the cross pieces 81.

As best shown in FIG. 8, the upper blades 29 being lighter are more simply fastened to the cooperating cross pieces 81. Each upper cross piece 81 is provided with holes 91 near its respective ends that receive short pins 92 extending rearwardly from the blade 29. The pins 92 project through the holes 91 and are provided with key holes 93. Cotter pin keys 94 secured in the holes 93 retain the blade 29 on the cross piece 81. Material building up and hardening about the pins 92 lock them in the holes 93 and secure the blades to the arms 78. When the upper blades 29 have become worn beyond further use they may be removed readily simply by driving the pins 92 out of the holes 93 in the cross piece 81, the cotter keys 94 being sheared off as the pins are driven through the hardened material and the holes in the cross pieces.

The liquid ingredient that is added to the batch being mixed in the mixing chamber 25 is introduced through the previously mentioned supply pipe 39 from a measuring source (not shown) which in the case of concrete may be a water meter or a weighing batcher. When a water batcher is used the mixing water usually flows from the batcher by gravity under low head, and the supply pipe 39 is therefore of generous size to provide for a rapid rate of flow. As best shown in FIGS. 3 and 4, the vertically disposed supply pipe 39 connects with a horizontally positioned header pipe 99 extending parallel with and supported by the main frame 21. From the header pipe 99 a short full sized discharge pipe 100 extends downward beneath the frame 21 to a main discharge nozzle 101. According to a feature of this invention, the main discharge nozzle 101 is directed to discharge the water ingredient of the batch on to the top of the dome shaped mixing rotor 31 rather than directly into the mixing chamber 25. The water falling upon the rotating umbrella-shaped rotor dome 31 splashes from it and is thrown outwardly by centrifugal force in manner to be distributed and dispersed as a descending curtain over the surface of the batch of dry ingredients in the annular mixing chamber 25 and is then mixed immediately into the batch by the revolving mixing blades. In this way the water becomes integrated with the dry ingredients rapidly and does not form pools on the surface.

An incidental advantage resulting from distributing the water in this manner over the surface of the dry ingredients is that by wetting the surface materials continuously there is less likelihood of dust arising from the dry ingredients as they are stirred by the mixing blades. Another incidental advantage derived from directing the water nozzle 101 onto the rotor 31 is that the stream of water washes away any material that may fall upon the rotor during charging and mixing and that would otherwise harden and build up in a manner to require periodic cleaning.

By introducing the mixing water inwardly of the mixing chamber 25 in this manner, it is possible to avoid any concentration or excess of water in the region of the outer wall 23 which might otherwise act as a lubricant between the wall and the mass of concrete being mixed and thereby permit the entire mass to rotate or circulate without mixing. At the inner wall 24 the overhanging rim of the rotor 31 shields the dry ingredients from the water pouring onto the rotor. To supply additional water to this region smaller auxiliary discharge nozzles may be provided. At the end of the header 99 opposite from the main discharge pipe 100 a small auxiliary discharge pipe 102 somewhat longer than the pipe 100 depends into the chamber 25. At its lower end the pipe 102 is provided with a secondary nozzle 103 that directs a small stream of water inwardly below the rotor 31 onto the sheltered dry ingredients near the inner wall 24.

Futhermore, additional water may be supplied to this area through another small auxiliary discharge pipe 104 that extends from the main nozzle end of the header pipe 99 outwardly and downwardly outside of the pan 20. Below the pan 20 the pipe 104 extends inwardly to the open central space 26 defined by the circular inner wall 24 and then upwardly through the center thereof to the top or rim of the wall. An auxiliary or tertiary nozzle 105 on the upper end of the pipe 104 discharges an auxiliary stream of water over the rim onto the ingredients close to the inner wall. As shown in the drawing, the pipe 104 extends upwardly concentric with the pan 20 and its upper end may be swiveled about the central axis to adjust the nozzle 105 angularly to provide for introducing the auxiliary water at any desired circumferential position relative to the charging chute 38, for instance. The sizes of the auxiliary nozzles 103 and 105 may be selected to provide the required proportion of the total water ingredient to be supplied by each to the inner portion of the batch being mixed.

Under various conditions the proportion of the total liquid that is supplied through the auxiliary nozzle may be quite different and under some circumstances the auxiliary liquid may be dispensed with entirely. To provide for regulating the flow of water through the several nozzles, the main discharge pipe 100 is provided with a flow controlling valve 106 and the auxiliary pipes 102 and 104 are provided with valves 107 and 108 respectively. These valves are manually controlled and may be adjusted to establish the share of mixing water supplied through each nozzle in accordance with different conditions that may be encountered from time to time.

To further reduce the likelihood of dust arising from the dry ingredients as they are being introduced into the mixing pan 20, the pan is provided with a cover 111 that extends over it from edge to edge as shown in FIG. 3. The cover 111 is fitted around the central mixing rotor 31 and is provided with suitable openings to receive the charging chute 38 and the water pipes. A door 112 hingedly mounted in the cover 111 may be opened to afford access to the interior of the pan 20.

The previously mentioned discharge door 40 and the complementary discharge opening 41 that it controls in the floor 22 of the pan 20 have the general shape of an isosceles trapezoid. As best shown in FIGS. 3 and 5 of the drawing, the trapezoidal discharge opening 41 is disposed in the pan floor 22 with its narrow end downstream of the mixing direction and skewed or slanted outwardly somewhat to bring one equilateral side thereof into substantially chordal relationship with the outer wall 23 of the pan 20. At its wider upstream end the discharge opening 41 is of such width that it extends substantially across the mixing chamber 25 with its inner upstream corner closely adjacent to the inner cylindrical wall 24.

After the batch of material within the pan 20 has been thoroughly mixed, the door 40 is opened by withdrawing it endwise beneath the floor 22 of the pan 20. The mixed material above the opening 41 and adjacent to it then immediately falls by gravity through the opening into the discharge chute 42 whereupon the advancing mixing blades push additional material forward into the discharge opening. The length of the opening 41 and its orientation is such that the material being discharged has opportunity to drop through it before the blades can carry the material across to the other side of the opening. In this connection, the material near the outer wall which is moved by the blades at the fastest lineal speed, moves into the longest part of the discharge opening 41 and therefore has the most favorable area for discharging.

The lower mixing blades 28 are of plow-shape with pointed noses that operate close to the floor 22 and from which the curved mixing faces 82 are inclined upwardly and rearwardly. To facilitate discharging the final portion of the mixed material, each blade 28 is provided with an upstanding vertical fin 114 that extends from the leading nose end rearwardly along the back edge of the upwardly inclined mixing face 82, as best shown in FIGS. 9 and 10. When the greater part of the mixed batch has been discharged through the opening 41, the lower blades operate as scoops to gather and push the remaining material along the floor and into the discharge opening. During this final discharging operation, the upstanding fin 114 of each blade slices through the material on the pan floor 22 in manner to prevent the material from scattering by flowing over the point and the forward end of the blade to the rear side of the blade. This causes the final portions of the material to be gathered and urged forwardly by each blade and laterally into the path of a following blade that likewise urges it toward the discharge opening.

The fin of the outermost blade 28 acts as a scraper to remove whatever material may adhere to the outer wall while the fin of the innermost blade 28 scrapes material from the inner wall and in addition operates to divert it into the inner corner of the discharge opening 41 during discharging. In this manner substantially all of the last portions of the mixed material is moved expeditiously around the pan 20 and into the opening 41 thereby effecting discharge of the entire batch rapidly and completely to empty the pan for receiving a new batch of ingredients with least delay. If, on the other hand, it is desired to effect a reduced rate of discharge of the mixed material, to accommodate the rate of charging of a receiving vehicle such as a truck mixer, for example, the discharge opening 41 may be opened only partially as indicated in FIG. 3, the rate of discharge being determined by the degree of opening of the door.

As appears in the drawing, the door 40 is constituted primarily by a renewable door plate 116 the downstream end of which is in the shape of an isosceles trapezoid and is generally complementary in shape and size to the discharge opening 41 although the plate 116 is somewhat longer than the opening. The renewable door plate 116 is of wear resisting material adapted to withstand the abrasive action resulting from mixing concrete or the like in the chamber 25. Likewise renewable liner plates 117 of similar wear resisting material are applied to the upper surface of the pan floor 22 and to the inner surfaces of the outer wall 23 and the inner wall 24. Any of these plates may be removed when worn and replaced by new plates.

By having the door 40 and the opening 41 of complementary tapered shape, the door may be closed tightly by wedging it endwise into the tapered opening. This is effected by mounting the door for endwise sliding movement at a slight angle of inclination to the pan floor 22 whereby when the door is closed the downstream narrow end of the door plate 116 extends upward flush with the renewable wear plate 117 of the pan floor while the wider upstream end of the door plate is inclined downward and lies beneath the floor. Even though the door 40 is snugly wedged in the tapered opening 41, it can be opened readily by withdrawing it endwise beneath the floor 22 since the engaging tapered edges draw apart at once and do not rub upon each other to bind and stick.

The floor 22 of the pan 20 is reinforced about the edges of the discharge opening 41 to compensate for the weakening effect resulting from cutting away the floor structure to form the opening. As shown in FIGS. 11 to 15, relatively deep depending flanges 119 are secured to the underside of the floor 22 along and close to the two equilateral sides of the opening 41. A channel member 121 extends along the underside of the floor 22 close to the narrow downstream end of the opening 41 and in the area at the upstream end, which is occupied by the door when retracted, the floor is constituted by an extra thick plate 122. The flanges 119 and the channel member 121 not only reinforce the floor but also constitute a shielding baffle that directs the discharged material into the chute 42.

Inwardly of the flanges 119 along the equilateral edges of the opening 41 sealing bars 124 are provided beneath the floor to constitute thickened parts of the floor structure for engaging and sealing the inclined tapered edges of the door 40. Since the door 40 is at an angle, the horizontal sealing bars 124 are necessarily thicker than the floor plates and underlie them to provide the required contact area. The bars 124 are slotted to receive fastening screws 125 whereby they may be adjusted inward or outward properly to engage and seal against the part of the inclined door edge that extends below the level of the floor plates.

Along its narrow downstream end the discharge opening 41 is provided with a sealing lip 126 that is secured to the transverse channel 121 and that extends inwardly and is curved downwardly to engage with the bottom of the narrow end of the door plate 116 in sealing relationship when the door is closed while holding the upper surface of the door plate 116 substantially flush with the upper surface of the liner plate 117 on the floor 22. Thus when the door is closed its narrow downstream end rides up on the sealing lip 126 but does not quite abut the floor plate 117 as its tapered sides come into wedging engagement with the side sealing bars 124.

As appears in FIG. 11, the door plate 116 is somewhat longer than the discharge opening 41, its upstream depressed end having parallel sides and being turned downward at its extreme end beneath the floor 22. While the downstream end of the inclined door 40 is flush with the floor 22, the upstream end slants slightly downward and extends in overlapping relationship underneath the floor. Sealing at this underlying end of the door is effected by means of a hardened lip bar 127 that bears upon the top of the door plate 46 and that is carried beneath the distal end of a flexible plate 128 which is mounted flush with the liner 117 of the floor 22 and is prestressed to urge the lip 127 downward into sealing engagement with the upper surface of the door plate 11b. The flexible plate 128 is secured at its upstream end to the thick plate 122 constituting that part of the floor 22 by means of bolts 129 and is disposed flush with the renewable liner plates 117 that cover and protect the surface of the floor 22. As previously mentioned, the liner plates 117 and the door plate 116 may be removed when worn and replaced by new plates. In the same manner, the sealing lip 126, the wedge bars 124 and the flexible plate 128 with its sealing lip bar 127 are all readily renewable when worn.

The door sealing arrangement provided by this invention does not depend upon pliable sealing materials that wear out quickly in use but relies entirely upon metal-to-metal sealing having long operating life. The sealing action is through wedging contact and without straight on abutting contact or long sliding rectilinear contacts which might jam. Furthermore, the engaging sealing surfaces are self-cleaning and do not present steps, grooves or pockets to accumulate material and cause binding. With the door 40 mounted slightly inclined as shown in FIGS. 11 and 14, the door can be opened by withdrawing it endwise beneath the upstream edge of the discharge opening 41 and yet can be closed with the downstream end flush with the pan floor liner 117. By this arrangement, the blades 28 in travelling over the door 40 while mixing sweep the material along the inclined door plate 116 and across the flush downstream end onto the floor liner 117 without meeting with any obstruction to the flow of the material along the floor of the pan. Because of the slight depression resulting from the inclination of the door 40, when the pan is empty and the door closed the small amount of grout material remaining from the preceeding batch tends to gather on the door as the blades push it along the floor. This residual grout material flows into any interstites along the joints between the door 40 and its sealing elements at all four sides and seals them against leakage. With the residual grout on the inclined door, the points are sealed sufficiently to prevent any substantial leakage of water which is normally introduced into the mixing chamber 25 slightly before the dry ingredients for the next batch are fed in through the charging chute 38. When the sand and cement ingredients of the next batch cover the door 40, the sealing effect is increased and the likelihool of leakage is further reduced.

As shown in FIGS. 11 and 14, the door plate 116 is reinforced around its edges by depending flanges 134 that form a door frame that are secured to the lower side of the plate 116 by means of bolts 135, the arrangement being such that the plate 116 may be removed from the door frame readily for renewal when worn. The depending reinforcing flanges 134 at the upstream and the downstream ends of the door 40 are in the form of transverse channel members which rest upon and are attached to small box beams 136 that constitute the supporting elements which carry the door 40 in its endwise sliding movements. The transverse box beams 136 are both of the same length and carry at their respective outer ends upstanding brackets 137. Stub shafts 138 project inwardly from the upper ends of each of the four brackets 137 and carry at their inner ends door supporting rollers 139 mounted on antifriction bearings 140 for movably supporting the door 40 at its four corners.

As best seen in FIG. 12, the inwardly projecting rollers 139 fit in trackways 141 formed by a pair of outwardly facing channel members that are secured at the opposite sides of the discharge opening 41 beneath the pan floor 22 and parallel with the direction of movement of the door 40. The two trackway channels 141 are inclined relative to the pan floor 22 at the angle of inclination of the door 40 relative to the opening 41. The trackways 141 are of sufficient length to provide for inclined endwise movement of the door along a straight line path between its open and its closed positions as the rollers 139 roll along renewable liner strips on their lower flanges.

The upper flanges of the channels 141 are in closely spaced relationship with the upper sides of the rollers 139 and operate to prevent excessive upward movement of the door 40, particularly at its downstream end when it rides up on the sealing lip 126 in closing. In order to prevent the door 40 from skewing and binding in its movements and to maintain it in transverse operating alignment with the discharge opening 41, each of the trackway channels 141 is provided on its inner side with an inverted toothed rack 142. The two racks 142 are in meshing engagement respectively with toothed pinions 143 fixed on the respective ends of a transverse shaft 144 that is journalled in spaced bearings 145 attached to the transverse beam 136 beneath the upstream end of the door 40. By operation of the inter-connected pinions 143 along the racks 142 both sides of the door 40 are constrained to move together and neither side can get ahead of the other, which action might otherwise cause binding of the rollers 139 within the trackways 141 and other difficulties.

As previously mentioned, the upstream end of the door plate 116 that extends beneath the floor 22 when the door is in closed position is provided with parallel sides. These parallel sides cooperate respectively with adjustable parallel guide plates 146 that are secured to the tops of the respective trackway channels 141, as shown in FIG. 12. When the door 40 is opened, the parallel guide plates 146 serve to maintain it in a generally central position relative to the discharge opening 41. The guide plates 146 are adjusted to provide a loose fit with the door in order to permit sufficient lateral movement during closing to insure that the tapered sides of the door plate 116 are free to move into proper wedging engagement with the sealing bears 124 at the sides of the discharge opening 41. In addition to serving as a guide member, the extended upstream end of the door plate 116 is provided with a down-turned edge that projects over and operates as a shield for the pinions 143 and their shaft bearings 145 to protect them from grout material or wash water that might drip from the door when not tightly sealed.

Opening and closing movements of the door 40 are effected by power preferably through operation of a hydraulic cylinder 151 mounted beneath the floor 22 at the upstream end of the discharge opening 41, although it is to be understood that other power means such as an air cylinder may be used. As shown in FIG. 11, the cylinder 151 is provided with a piston rod 152 that projects forwardly from the cylinder through a relatively large opening 153 in the depending flange 134 at the upstream end of the frame of the door 40 and is pivotally connected at its forward end to brackets on the flange 134 depending from the downstream end of the door.

The cylinder 151 is pivotally connected at its closed upstream end to a bracket 154 that is in turn connected by bolts 155 and shims 156 to an angle member 157 that is secured to and depends from the bottom of the pan floor 22. When the door 40 is closed as shown in FIG. 11 the piston rod 152 is fully extended from within the cylinder 151. As wear takes place between the sides of the door plate 116 and the side sealing bars 124 and between the downstream end of the door plate and the sealing lip 126 any leakage that may occur can be corrected by causing the door to advance a little farther downstream in closing. This can be accomplished readily by removing the bolts 155 that secure the cylinder supporting bracket 154 and reducing the thickness of the shims 156 by the proper amount. When the bolts 155 are replaced and tightened, the bracket 154 and the cylinder 151 will be moved sufficiently in the downstream direction to restore the door plate 116 to tightly fitting relationship both with the sealing lip 126 and the side sealing bars 124.

Hydraulic fluid under pressure for actuating the piston rod 152 in the hydraulic cylinder 151 is derived from the previously mentioned hydraulic pump 63 that is driven by the motor 36 on the main frame 21 as shown in FIGS. 1 and 4. The pump 63 is indicated diagrammatically in FIG. 11 as connected to withdraw hydraulic fluid from the reservoir 64 through a conduit 160 and to deliver it under pressure through a pressure conduit 161 to a three-way control valve 162. From the control valve 162 a return conduit 163 returns exhaust fluid to the reservoir 64 in the usual well known manner. The control valve 162 is provided with an operating handle 164 by means of which it may be operated manually or power actuated means may be provided alternatively for shifting the valve by remote control. The valve 162 is so arranged internally in a well known manner that when the control handle 164 is in its central neutral position as shown in the drawing, the fluid delivered from the pump 63 through the conduit 161 will be bypassed within the valve into the return conduit 163 and circulated at low pressure back to the reservoir 64. Furthermore the valve 162 is provided internally with a pressure limiting relief valve that may be adjusted to permit the escape of excess fluid into the return conduit 163 should the pressure in the pressure conduit 161 exceed a selected maximum.

When it is desired to open the door 40, for example, the control handle 164 is moved from the central neutral position toward the right as seen in the drawing thereby closing off the connection between the pressure conduit 161 and the return conduit 163. At the same time a connection is established between the pressure conduit 161 and a conduit 165 leading to the rod end of the hydraulic cylinder 151. Also a conduit 166 leading from the closed end of the cylinder 151 is connected through the valve 162 to the return conduit 163. Pressure fluid thus admitted to the rod end of the hydraulic cylinder 151 causes the piston rod 152 to be moved toward the right thereby retracting the attached door 40 toward open position. Fluid in the closed end of the cylinder 151 escapes through the conduit 166, the valve 162 and the return conduit 163 to the reservoir 64.

If it is desired to open the door 40 only partially to limit the rate of discharge, the control handle 164 is returned to its central neutral position when the door is sufficiently opened. The valve 162 then operates to bypass pressure fluid from the conduit 161 into the return conduit 163 and to close off both of the conduits 165 and 166 to trap fluid in the cylinder 151 for retaining the piston 152 and the door 40 in the selected partially open position.

When it is desired to close the door 40, the control handle 164 is moved to the left from its neutral position thereby closing off the connection between the pressure conduit 161 and the return conduit 163. The pressure conduit 161 is then connected with the conduit 166 leading to the closed end of the cylinder 151 and the conduit 165 leading from the rod end of the cylinder 151 is connected to the return conduit 163. Since the door 40 moves substantially horizontally in closing when the pressure fluid is admitted to the closed end of the cylinder 151 it can be closed readily against the downward flow of the material being discharged to decrease the rate of flow as desired or to shut off the flow entirely. If the door should fail to close entirely because of some hard object such as a stone becoming lodged between the door and an edge of the opening 41, the object can be dislodged readily merely by reversing the door movement momentarily through operation of the control handle 164. In situations where the door 40 cannot be observed readily, an indicator such as a pilot light may be provided to indicate when the door is fully closed.

In order to avoid damage to the door 40 or to its cooperating sealing surfaces by objects that may be caught between them, the closing force exerted upon the door by the piston rod 152 may be limited as desired by means of an adjustable auxiliary pressure relief valve 168 that is provided in the conduit 166 leading to the closed end of the cylinder 151. In practice the auxiliary relief valve 168 has ordinarily been set to relieve pressure higher than about seven hundred fifty pounds per square inch. When the door closing pressure exceeds the amount for which the valve 168 is set the excess fluid escapes through the valve 168 into a conduit 169 that leads to the return conduit 163. The previously mentioned internal pressure relief valve within the control valve 162 has ordinarily been set to relieve pressure higher than about twelve hundred pounds per sqaure inch to limit the door opening pressure within the rod end of the cylinder 151.

After the mixing machine has been in operation for some months mixing abrasive materials such as the aggregate ingredients of concrete or the like, the expendable mixing blades, liners and other parts within the pan 20 become worn and require replacement. Because of the cramped working space within the pan of a mixer of this type, it has always heretofore been difficult to remove and replace the worn parts, particularly such items as the lower mixing blades 28 and the liner plates 117 on the pan floor 22. The difficulties previously experienced in this connection with mixers of the pan type have been overcome in accordance with a feature of this invention by providing novel built-in equipment for lowering the pan 20 readily to expose the mixing blades and liner plates for convenient replacement.

As best shown in FIGS. 2 and 4 of the drawing, the mixing pan 20 is restrained from turning relative to the frame 21 during mixing operations, by means of a series of torque resisting bolts 172 that extend horizontally through upstanding lugs 173 on the upper outturned rim 174 of the pan. The bolts 172 pass through holes in brackets 175 depending from the respective ends of the frame 21 and are secured by nuts 176. Since the tank-like pan 20 is of relatively light construction it is not adapted to sustain the full weight of a batch of heavy material when thus suspended from its upper rim. Accordingly a subframe 177 of structural channels is disposed beneath the floor 22 of the pan in generally parallel relationship with the main frame 21. To support the weight of the pan 20 and the load of ingredients being mixed, long threaded bolts 178 extend downward from the frame 21 along the outside of the pan 20 to the subframe 177. As appears in FIG. 3, one of the bolts 178 is rotatably mounted in a bracket 179 secured near each end of each of the spaced beams 46 and 47 of the main frame 21. The four depending bolts 178 extend downward through holes 180 in the upper rim 174 of pan 20 and through protecting guard tubes 181 that are secured to the outside of the outer pan wall 23.

At their lower ends the threaded bolts 178 pass through holes in the ends of the subframe 177. A pan supporting nut 182 is screwed on the lower end of each long bolt 178 and is drawn up tight against the lower surface of the subframe 177 in pan supporting relationship therewith to support the suspended pan 20 and its load of material being mixed. Lock nuts 183 are turned onto the bolts 178 below the supporting nuts 182 and locked against them to prevent accidental loosening of the pan supporting nuts.

To provide for lowering the pan 20 to gain access to its interior, a pan lowering nut 184 is threaded on each long bolt 178 and normally positioned just below but spaced a short distance from the lower surface of the pan rim 174 as best shown in FIG. 2. The lowering nuts 184 on the bolts 178 are restrained from turning thereon relative to the pan by engagement with the side of the pan wall 23.

When it becomes necessary to replace worn parts within the pan 20, the pan is disconnected from other parts of the machine and then lowered along the long bolts 178 that operate as jack screws. First the charging and discharging chutes are disconnected if necessary and the piping uncoupled. Then the torsion bolts 172 are removed to free the pan rim 174 from the frame brackets 175. With the pan otherwise free from connecting structures, the lock nuts 183 are removed from the lower ends of the long bolts 178 and the pan supporting nuts 182 then unscrewed. As the nuts 182 are unscrewed the pan 20 moves downward whereupon the auxiliary abutments constituted by the pan rim 174 come into contact with the auxiliary pan lowering nuts 184 which then take over and support the pan against further downward movement. The supporting nuts 182 may then be removed from the lower ends of the long bolts whereupon the pan is ready to be lowered.

Lowering of the pan 20 may then be accomplished by turning the exposed heads of the long bolts 178 at the top of the frame 21 to rotate the bolts within the lowering nus 184 which are restrained from roating, as previously explained. By turning the bolts equally the pan 20 may be lowered its full depth along the long bolts 178 to a position such as is indicated in dotted lines in FIG. 2 with the upper rim 174 of the pan near the lower ends of the bolts 178 and below the level of the mixing blades 28. The worn blades may then be removed as previously described and replaced with new ones and other repairs made as may be necessary.

After the repair work has been completed, the pan 20 may be raised to return into its working position by turning the bolts 178 in the other direction as jack screws to elevate it, When the pan nears its upper position the pan supporting nuts 182 are screwed on the lower ends of the bolts 178 and tightened to raise the pan to its final working position. The lock nuts 183 are then applied to the bolt ends and the torsion bolts 172 replaced after which the pipes and other items are reconnected and the mixing machine made otherwise ready to resume operation.

From the foregoing description of an exemplary mixing machine embodying the present invention and the accompanying explanation of the manner in which it operates, it will be apparent that a new and novel mixer of the fixed annular pan type has been provided that is capable of rapidly and thoroughly mixing material such as the ingredients of concrete or the like. This is accomplished by providing an improved arrangement for supporting the mixing blades together with a novel and rugged drive mechanism. A new water supply system is incorporated and a novel discharge door has sealing means that withstand hard use without leaking excessively. Furthermore, a built-in pan lowering arrangement of novel design is provided for facilitating access to the interior of the pan.

Although a specific example of the improved pan type mixer has been set forth in detail by way of a full disclosure of a practical and useful embodiment of the invention, it is to be understood that other arrangements of the improved features disclosed herein may be incorporated in apparatus of different construction by those familiar with the art of mixing the ingredients of concrete and similar materials without departing from the spirit and scope of the invention as defined in the subjoined claims.

The novel features of this invention having now been fully set forth and explained, I claim as my invention:

1. In a mixer of the pan type adapted for mixing the ingredients of concrete or the like, a main frame disposed substantially horizontally, a mixing rotor carried by said main frame and journalled for rotation about a vertical axis substantially centrally of said main frame, power actuated means mounted on said main frame and operatively connected to said mixing rotor to drive it, a circular mixing pan disposed beneath said main frame concentrically of said vertical axis of said mixing rotor and in cooperating relationship therewith, replaceable wearing liner plates secured within said mixing pan, supporting lugs upon the upper edge and the lower edge respectively of said mixing pan, replaceable mixing blades carried by said mixing rotor in operation relationship with said liner plates in said circular mixing pan for mixing ingredients therein when said rotor is driven by said power actuated means, a plurality of long threaded bolts rotatably mounted in said main frame and depending therefrom each in cooperating relationship with both an upper and a lower one of said supporting lugs on said pan, upper nuts threaded on said long bolts below and closely adjacent to said upper supporting lugs, and lower nuts threaded on the lower ends of said bolts below and in pan supporting relationship with said lower pan supporting lugs, the arrangement being such that to gain access to the interior of said pan said lower supporting nuts may be unscrewed from said bolts thereby lowering said pan somewhat to bring said upper lugs into engagement with said upper nuts which then retain said pan whereupon by relative rotation between said bolts and said upper nuts said pan may be lowered along the threads of said long bolts a distance substantially equal to the depth of said pan thereby exposing said replaceable mixing blades for renewal or other servicing and facilitating access to the interior of said pan for renewal of said replaceable liner plates.

2. In a mixer of the pan type adapted for mixing the ingredients of concrete or the like, a main frame disposed substantially horizontally, a mixing rotor journalled centrally of said main frame for rotation upon a vertical axis therein, power actuated means mounted on said main frame and operatively connected to said mixing rotor to drive it, a circular mixing pan disposed beneath said main frame concentrically of said vertical axis of said mixing rotor, supporting lugs spaced upon the upper edge and the lower edge respectively of said mixing pan, expendable mixing blades carried by said mixing rotor in cooperating relationship with said circular mixing pan for mixing ingredients therein when said rotor is driven by said power actuated means, a plurality of long threaded bolts rotatably mounted in said main frame and depending therefrom in cooperating relationship with said upper and said lower supporting lugs on said pan, upper nuts threaded on said bolts below and closely spaced from said upper supporting lugs, and lower nuts threaded on the lower ends of said bolts below and in pan supporting relationship with said lower pan supporting lugs, the arrangement being such that when said mixing blades become worn said lower supporting nuts may be removed from said bolts whereupon said upper lugs engage said upper nuts and retain said pan which may then be lowered along the threads of said long bolts by rotation thereof to expose and provide access to said expendable mixing blades.

3. In mixing apparatus for mixing concrete and the like, a frame, a pan suspended beneath said frame for containing ingredients of concrete being mixed, mixing apparatus depending from said frame into said pan to mix concrete therein, a plurality of threaded bolts rotatably mounted in said frame and depending therefrom alongside of said pan, upper and lower supporting brackets projecting from said pan in the region of its upper edge and of its floor respectively and presenting openings disposed to receive said depending threaded bolts, lower nuts threaded on the lower ends of said bolts in manner to engage said lower brackets to support said pan, and an upper nut threaded on each of said bolts beneath said cooperating upper bracket, the arrangement being such that upon removing said lower nuts from said bolts said pan is supported upon said upper brackets and cooperating upper nuts and may then be lowered by relative rotation of said bolts and said upper nuts to a position below said mixing apparatus for facilitating servicing of the interior of said pan and said mixing apparatus.

4. In mixing apparatus of the pan type for mixing concrete and the like, a horizontally disposed main frame, a circular mixing pan suspended beneath said horizontal main frame and constituting a mixing chamber for containing ingredients of concrete being mixed, mixing apparatus depending from said frame into said pan to mix concrete therein, said mixing apparatus comprising a power transmission mechanism casing mounted on said main frame centrally of said pan, a mixing rotor journalled upon and extending downward from said casing for rotation about a vertical axis concentric with said pan, a speed reducing power transmission mechanism mounted within said casing and operatively connected to said mixing rotor to drive it, a driving motor mounted on said frame and operatively connected to said transmission mechanism within said casing to drive it, mixing blades carried by said mixing rotor in cooperating relationship with said mixing pan to mix concrete in said mixing chamber when driven by said motor operating through said transmission mechanism, a plurality of threaded bolts rotatably mounted in said frame and depending therefrom alongside of said mixing pan, upper and lower supporting brackets projecting from said pan in the region of its upper edge and of its floor respectively said brackets presenting openings disposed to receive said depending threaded bolts, lower nuts threaded on the lower ends of said bolts in manner to engage said lower brackets to support said pan, and an upper nut threaded on each of said bolts beneath said cooperating upper bracket, the arrangement being such that upon removing said lower nuts from said bolts said pan is supported upon said upper brackets and cooperating upper nuts and may then be lowered by relative rotation of said bolts and said upper nuts to a position below said mixing rotor for facilitating servicing of the interior of said pan and said mixing blades on said rotor.

References Cited by the Examiner

UNITED STATES PATENTS

| 621,071 | 3/1899 | Grannell | 259—178 |
| 702,881 | 6/1902 | Otis | 259—178 |
| 882,830 | 3/1908 | Luttrell | 259—165 |
| 967,646 | 8/1910 | Laun | 259—178 |
| 1,051,003 | 1/1913 | Peterson | 259—179 |
| 1,791,880 | 2/1931 | Tuck | 259—178 |
| 1,934,116 | 11/1933 | Canfield | 259—178 |
| 2,054,042 | 9/1936 | Pipes | 259—165 |
| 2,187,897 | 1/1940 | Ballard | 259—178 |
| 2,660,416 | 11/1953 | Camp et al. | 259—178 |
| 2,809,816 | 10/1957 | Whitehead et al. | 259—178 |
| 3,069,145 | 12/1959 | Fejmert | 259—178 |
| 3,020,029 | 2/1962 | Fijmert | 259—178 |

FOREIGN PATENTS 1,091,927   10/1960   Germany.

WALTER A. SCHEEL, *Primary Examiner.*

WILLIAM I. PRICE, *Examiner.*